United States Patent [19]
Yeh et al.

[11] Patent Number: 5,213,440
[45] Date of Patent: May 25, 1993

[54] METHOD OF MAKING YELLOW TRANSPARENT TEMPERED GLASS AND GLASS PRODUCT

[76] Inventors: Jien-Wei Yeh, 3F., No. 60, Ching Da Shi Yuan, Section 2, Kuang Fu Road; Jenn-Jye Chu, No. 77, Ho Ping Road, both of Hsin Chu City, Taiwan

[21] Appl. No.: 765,675

[22] Filed: Sep. 26, 1991

[51] Int. Cl.$^5$ .......................... G08B 1/00; C03C 3/155
[52] U.S. Cl. ........................................ 404/14; 65/134; 501/64; 501/901
[58] Field of Search ...................... 65/134; 404/12–14; 501/64, 901

[56] References Cited

U.S. PATENT DOCUMENTS

| | | | |
|---|---|---|---|
| 3,877,785 | 4/1975 | Schaefer | 404/12 X |
| 3,901,583 | 8/1975 | Schaefer | 404/12 X |
| 4,769,347 | 9/1988 | Cook et al. | 501/64 |
| 4,977,110 | 12/1990 | Amundson et al. | 50/64 X |
| 5,061,659 | 10/1991 | Ciolek et al. | 501/64 |

Primary Examiner—Robert L. Lindsay
Attorney, Agent, or Firm—Larson and Taylor

[57] ABSTRACT

A method of making a yellow, transparent tempered glass and the product so made that comprises adding a certain quantity of $CeO_2$ and $TiO_2$ to the glass composition prior to a rapid cooling of the composition. Each additive is in the amount of about 1% to 6% and together they produce a yellow color. Also, at the same time, from 1% to 5% of BaO or PbO is added as an additive for enhancing the transparency and refractive index of the glass. The resulting yellow transparent tempered glass is especially suited for use in a reflecting roadstud and used for separating the traffic lanes on roads.

2 Claims, 1 Drawing Sheet

METHOD OF MAKING YELLOW TRANSPARENT TEMPERED GLASS AND GLASS PRODUCT

FIELD OF THE INVENTION

This invention relates to a method of making colored tempered glass, the additive used, and the resulting glass so made. In particular, this invention relates to a method of using an additive to make yellow transparent tempered glass, the glass so made, and the use of the glass in a reflecting roadstud used to separate traffic lanes.

BACKGROUND OF THE INVENTION

Generally speaking, there are many ways to provide warning marks which separate traffic lanes on roads. The most common and simplest way is to apply a coating of white, yellow or red paint to the road surface, which can be an asphalt pavement, in accordance with the appropriate color for the type of warning desired. Because these marks are not always visible or clear to drivers, particularly at dangerous turns, at night, on rainy days and in heavy fog, they cannot provide an appropriate safety warning function In addition, the paint coatings will fade after time because of wear by vehicles running over them and deterioration by weather. Therefore, roadstuds having appropriate heights and made from aluminum alloy or plastics are used on the pavements. These roadstuds have front and rear inclined planes in which reflective pieces are inserted to reflect light from a vehicle's headlights, and thus increase the warning effect. Although this product is superior to a paint line for light reflecting properties, it still has many practical drawbacks.

(A) The compressive yield strength of the above-mentioned aluminum alloy or plastics structure are all below one ton. Moreover, the breaking strength is below 3 tons. Therefore, they are easily deformed or fractured by a compressive load. Thus, frequent replacement must be made. Furthermore, it is likely that this type of marker can be punctured.

(B) As the reflective piece of the aforesaid light-reflecting roadstud is externally exposed, it is susceptible to the collection of dust and damage from being crushed, thereby losing its reflective properties in either case.

Considering these drawbacks, a reflective roadstud called "Armor Light" has been developed using tempered glass by South-African Pilkington Company (as shown in FIG. 1 and 2). The roadstud comprises an embedded round, plate part (A) and a semi-spherical protruding part (B). The outside of the embedded part is plated with an aluminum or zinc metal film to form a reflective side mirror (C). The protruding part (B) serves to collect the incident light and focus it on the reflective mirror (C) which in turn reflects the light again and passes it back through the protruding part (B). Hence, this roadstud can condense and reflect the light and look like a bulb in the night. It indeed offers a clear warning to drivers about the position of the separating line on the roads at night and in bad weather. Furthermore, in order to improve the resistance to the impact and wear by vehicles, the glass roadstuds are all subjected to a tempering treatment to increase their strength and surface hardness. On an average, the compressive fracture strength is set at above 20 tons, while that of the glass without a tempering treatment is only around 5 tons.

Though the Pilkington's roadstud using tempered glass can avoid the above-mentioned drawbacks of those roadstuds structurally made of aluminum or plastics, because of the specific composition of the glass, the roadstud has a blue-green color. No matter whether they are used on a white or yellow separating line, they all reflect a green light from a car's headlight. This is not in conformity with the color of the separating lines. In particular, placing this roadstud on the yellow separating lines would easily bring confusion to drivers, and would adversely affect the traffic order.

Due to this Achilles' heel, the glass roadstud has not received broad application on the road until now. Furthermore, since the glass roadstud contains no ingredient which can increase the reflective index and transparency, it has the properties of ordinary window glass. Consequently, the reflecting light intensity is not high and it shows no brilliant effect such as provided by crystal glass or optical glass. If these two properties were improved, it can be expected that the performance of the glass roadstud would increase, especially in bad weather.

SUMMARY OF THE INVENTION

The object of the present invention is to provide an additive to make yellow tempered glass having a high transparency and reflective power which can be used as reflecting roadstuds on yellow separating lines. The additive is preferably a combination of ingredients.

In a preferred embodiment, prior to the rapid-cooling step in the process for making a tempered glass product, a quantity of $CeO_2$ and $TiO_2$ in an amount in the range of 1%-6% is added to the glass raw materials to serve as coloring agents for a yellow color, and a quantity of $BaO$ or $PbO$ in an amount in the range of 1%-5% is added as ingredients for enhancing of the transparency and refractive index. The glass thus manufactured possesses a superior combination of properties and is especially suitable for use in a reflecting roadstud used on pavements.

With this in mind, this invention is to provide a tempered glass capable of achieving a higher refractive index and transparency and yielding a yellow color which is very suitable for use as a reflecting roadstud for yellow separating lines.

These and other objectives, advantages and features of the present invention will be set forth in or apparent from the detailed description of the presently preferred embodiments described hereinbelow.

DETAILED DESCRIPTION OF THE PREFERRED EMBODIMENTS

Figure 1:
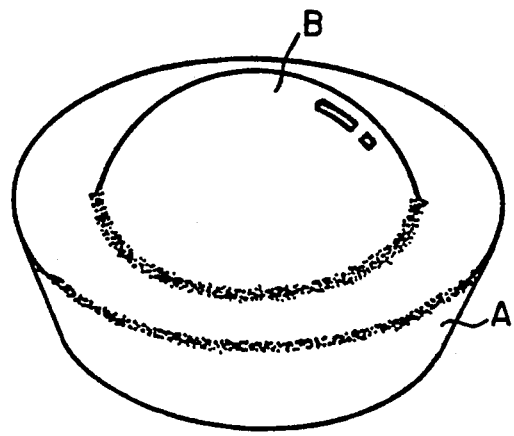
FIG. 1 is a perspective view of an "Armor Light" tempered glass roadstud.
Figure 2:
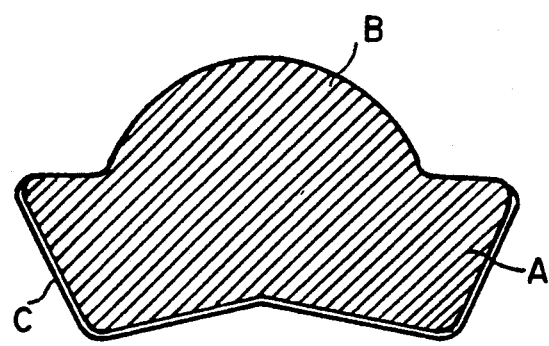
FIG. 2 is an elevational cross sectional view taken in FIG. 1.

All reflecting glass roadstuds must undergo tempered treatment after being formed in a mold. There are many ways to increase the strength and impact resistance of these roadstuds. In the industrial fields, there are two common methods: a chemical strengthening method; and a thermal strengthening method. The chemical strengthening method involves the immersing and holding of a Na+containing glass in a salt bath containing K+, e.g. potassium nitrate or other potassium compound bath. Generally the treating condition lasts one or more hours at temperatures of 400° C.-500° C., and then slowly cooling the glass. After the treatment, the surface of the glass will have a high concentration of potassium ions because of the exchange of potassium and sodium ions by means of diffusion while in the salt bath. The concentration of potassium ions decreases from the external surface of the glass to the interior thereof. As the radius of potassium ion is greater than the radius of sodium ion, a compression state is developed on the surface which results in a higher fracture strength, impact resistance and hardness. Along with the decrease in the concentration of potassium ions, the compressive stress also decreases from the surface toward the interior. However, the diffusion layer of this chemical strengthening method is quite small (only about several 10s of microns), thereby making it unfit as a strengthening treatment for thick glass. Thus, this method is often adopted in the strengthening treatment for thin glass that is less than 1 mm in thickness.

The thermal strengthening method is to heat the glass above the softening point and then rapidly cool it down using a salt bath, an oil bath, blowing air or steam. Because of the shrinkage difference in the surface part and the core part, the glass surface acquires a state of compressive stress and the internal core acquires a state of tensile stress. Hence, the tensile strength, the compressive strength, the bending strength and the impact resistance are all improved to a high level. As the compressive stress layer is far thicker than the chemical strengthening method (about several mm), the thermal strengthening method is used as a strengthening treatment for thick glass. The thickness of glass roadstuds ranges from 20 mm to 40 mm. Obviously, the thermal strengthening method should be adopted to achieve a high strength and impact resistance. However, the thicker the glass, the more difficult it will be in performing the strengthening treatment. Apart from lowering the quenching temperature, appropriate glass composition must be selected to reduce the coefficient of linear expansion and the softening point and increase the inherent strength of the glass matrix. The principles are as follows.

(1) When the coefficient of linear expansion is reduced, the difference in surface and internal shrinkage may be reduced and in turn the internal tensile stress will not become too high. Since the self-explosion of the glass in the rapid-cooling stage usually originates from the central region, therefore lowering internal tensile stress could reduce the possibility of internal cracking and explosion.

(2) The reduction of the softening point is helpful in lowering the quenching temperature and thus reducing the shrinkage difference and the possibility of an explosive fracture.

(3) The higher inherent strength of glass matrix means a higher tensile fracture stress, so that the phenomenon of internal cracking is reduced.

Considering the facts that different oxides or compounds exert different effects on the above-mentioned properties of the glass and the contradictory effects among them quite often occurs, it is very important to select appropriate oxides or compounds as ingredients. Consider, for instance, the following examples. Although Al2O3 may raise the strength of the matrix and reduce the coefficient of linear expansion, it will increase the softening point. Although B2O3 can reduce the coefficient of linear expansion, it can lower the strength of the matrix and raise the softening point. CaO has the function of increasing the strength, but it can lower the softening point and the coefficient of linear expansion. Hence, a composition suitable for thermal tempering thick glass is difficult to derive from theoretical calculations. Usually a direct experiment is necessary to evaluate the appropriate composition. In the experiment, the molten glass according to the designed composition is firstly prepared in a crucible and then molded in a roadstud mold, and then finally rapidly cooled down from a suitable temperature. In the tempering stage, observations are made to see whether it is easy to develop cracking. If the yield of the product is high and the strength meets the requirements, then it can be regarded as a proper composition for the thermal strengthening treatment.

In the case of producing yellow glass, the traditional method in industrial use is the employment of a colloidal coloring method, which is subdivided into metal colloidal coloring method and a compound colloidal coloring method. The former method adds a silver compound such as AgCl and also adds a reduction agent such as SnO2 in the glass raw material. In the period of slow cooling down after the glass is removed, the tin ion reduces the silver ion and causes the yellow color to develop after the silver atoms aggregate to nucleate as submicron particles.

The basic reaction formula is as follows:

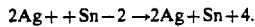

$$2Ag^+ + Sn^{-2} \rightarrow 2Ag + Sn^{+4}.$$

The compound colloidal coloring method employs the addition of CdS in the glass raw materials. In the cool down stage, CdS particle dispersion forms due to supersaturation, and thus this yields the yellow color.

However, the above-mentioned two coloring methods are not fit for manufacturing thermal tempering glass. This is because the particle nucleation and growth of the above-mentioned colloidal coloring methods must be achieved by means of chemical reaction and diffusion process. That means that slower cooling is required to obtain satisfactory dispersion and color. In the process of thermal tempering, the glass products usually cool down below the softening point within several minutes after being molded, thereby making the full formation of colloidal particles impossible. Under this circumstance, only a colorless or pale yellow glass can be obtained. Reheating the glass after tempering to above the softening point in order to develop the requisite precipitation and the resulting yellow color is not possible because the treatment would obviously eliminate the strengthening effect due to the anneal softening that would occur. Furthermore, if the glass is heat treated to yield a yellow color first at high temperature, then the strength of the matrix materials will be reduced because of the dispersion of the colloidal particle. Because the molded glass is incapable of withstanding the high internal tensile stress it tends to self explode during the tempering stage. Thus, there is almost no way to put the tempering treatment into practice along with the employment of the above-mentioned colloidal coloring method, thereby enabling the acquisition of a high tempering strength impossible.

In view of the foregoing problems, the present invention provides a non-colloidal coloring method that causes the glass to have a yellow color and to be feasible for a thermal strengthening treatment. Oxides of CeO2 and TiO2 are added to the composition together. By the cooperative interaction of these two ions, the glass can get a yellow color. As this coloring does not create contradictory effect against the thermal tempering treatment as the colloidal method, the yellow glass is treatable for thermal strengthening. Besides, in view of the importance of transparency and refractive index on light reflecting glass roadstud, BaO or PbO are employed as additives to increase transparency and refractive index. Experiments were made to check whether the glass can be thermally treated for strengthening. The results show that improved effects on transparency and refractive index are definitely achieved along with the results from a successful tampering treatment.

The invented composition of the present invention provides a yellow color with a high refractive index and a transparency suitable for use in tempered glass roadstud. The glass has the range as shown in the following table.

| Oxide (%) | Percentage by Wt. |
| --- | --- |
| SiO2 | 65-75 |
| Na2O | 12-18 |
| CaO | 8-15 |
| B2O3 | 0-4 |
| BaO | 1-5 |
| PbO | 0-5 |
| CeO2 | 1-6 |
| TiO2 | 1-6 |
| AS2O3 | 0-1 |

EXAMPLE 1

Glass with the following composition is prepared in the crucible: SiO2 —69.9%; Na2O —15%; CaO —15%; and As2O3—0.1%. After defecation, the glass is removed and poured into a roadstud mold, and then rapidly cooled down to get high strength. The results show that the finished product has acquired a compressive breaking strength above 20 tons, but the transparency is not good, the refractive index is similar to ordinary window glass, and it appears colorless.

EXAMPLE 2

Molten glass is prepared containing the following composition: SiO2 —67.8%; B2O3—2%; Na2O—15%; CaO—13%; BaO—2%; and As2O3—0.2%; and it is tempered after forming in a roadstud mold. The product is colorless, but the transparency and refractive index are higher and it looks like crystal glass. It has a compressive breaking strength of above 20 tons.

EXAMPLE 3

Molten glass is prepared in a crucible containing the following composition: SiO2 —69.8%; B2O3—2%; Na2O—13%; CaO—11%; PbO—4%; and As2O3—0.2%; and it is tempered after forming in a roadstud mold. The product is colorless, but the transparency and refractive index are high and it possesses a breaking strength of above 20 tons.

EXAMPLE 4

Molten glass is prepared in a crucible containing the following composition: SiO2—68.8%; B2O3—3%; Na2O—15%; CaO—8%; BaO—4%; CeO2—2%; and As2O3—0.2%; and it is tempered after forming in a roadstud mold. The product is colorless, but the transparency and refractive index are high and it possesses a breaking strength of above 20 tons.

EXAMPLE 5

Molten glass is prepared in a crucible containing the following composition: SiO2—71%; Na2O—15%; CaO—8%; BaO—4%; and TiO2—2%; and it is tempered after forming in a roadstud mold. The product is colorless, but the transparency and refractive index are high and it possesses a breaking strength of above 20 tons.

EXAMPLE 6

Molten glass is prepared in a crucible containing the following composition: SiO2—71%; B2O3—2%; Na2O—15%; CaO—8%; BaO—2%; CeO2—1%; and TiO2—1%; and it is tempered after forming in a roadstud mold. The product has a light yellow color, and both the transparency and refractive index are high and it possesses a breaking strength of over 20 tons.

EXAMPLE 7

Molten glass is prepared in a crucible containing the following composition: SiO2—67%; Na2O—15%; CaO—8%; PbO—2%; CeO2—4%; and TiO2—4%; and it is tempered after forming in a roadstud mold. The product has a yellow color similar to that of the road line, and both the transparency and refractive index are high and it possesses a breaking strength of over 20 tons.

EXAMPLE 8

Molten glass is prepared in a crucible containing the following composition: SiO2—63%; Na2O—15%; CaO—8%; BaO—2%; CeO2—6%; and TiO2—6%; and it is tempered after forming in a roadstud mold. The product has a deeper yellow color than that of the roadline, and both the transparency and refractive index are high and it possesses a breaking strength of over 20 tons.

The foregoing examples give a clear demonstration on the composition ranges as listed in the table, confirming that the breaking strength can reach over 20 tons after the tempering treatment is applied. Moreover, when cerium dioxide and titanium dioxide, each in the range of 1-6%, are added simultaneously (Examples 6-8), proper yellow color can be obtained. When 1%-5% of barium oxide and lead oxide are added (Examples 2-8), the transparency and refractive index of formed roadstud are both improved. Thus, the present invention provides a number of embodiments in which the strength, transparency and refractive index and yellow color of a formed roadstud are all excellent. Therefore, the roadstud made from the above-mentioned additives can provide a clear warning effect on the traffic lane defined by the yellow lines.

What is claimed is:

1. A yellow, transparent, high refractive, tempered molded glass roadstud consisting by weight percentage of the glass composition essentially of the following:

$SiO_2$ in an amount of about 65% to about 75%;
   $B_2O_3$ in an amount from 0% to 4%;
   $Na_2O$ in an amount of about 12% to about 18%;
   CaO in an amount from about 8% to about 15%;
   $As_2O_3$ in an amount from 0% to 1%;
   PbO in an amount from 0% to 5%;
   BaO in an amount from about 1% to about 5%;
   $CeO_2$ in an amount of from about 1% to about 6%; and
   $TiO_2$ in an amount of from about 1% to about 6%.

2. A method of making a roadstud from tempered glass comprising preparing a glass composition that includes CeO2 in an amount of at least about 1% by weight ratio of the glass composition, TiO2 in an amount of at least about 1% by weight ratio of the glass composition, and an oxide selected from the group consisting of PbO and BaO in an amount of about 1% to about 5% by weight ratio of the glass composition;

heating said prepared glass composition to above the softening point;

placing said softened glass composition in a roadstud mold;

forming a roadstud in said mold; and rapidly cooling down said molded glass composition to make a molded tempered glass roadstud.

* * * * *